United States Patent
Yurdakul et al.

(10) Patent No.: US 10,577,284 B2
(45) Date of Patent: Mar. 3, 2020

(54) EARLY STRENGTH ENHANCING CONCRETE ADMIXTURE

(71) Applicant: GCP Applied Technologies Inc., Cambridge, MA (US)

(72) Inventors: Ezgi Yurdakul, Sydney (AU); Damla Boyer, Medford, MA (US); Klaus-Alexander Rieder, Beverly, MA (US); Yohannes K. Lemma, Revere, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 0 days.

(21) Appl. No.: 16/019,739

(22) Filed: Jun. 27, 2018

(65) Prior Publication Data
US 2019/0002349 A1 Jan. 3, 2019

Related U.S. Application Data

(60) Provisional application No. 62/525,927, filed on Jun. 28, 2017.

(51) Int. Cl.
| | | |
|---|---|---|
| *C04B 28/28* | (2006.01) | |
| *C04B 28/24* | (2006.01) | |
| *C04B 24/42* | (2006.01) | |
| *C04B 40/00* | (2006.01) | |
| *C04B 40/02* | (2006.01) | |
| *C04B 28/02* | (2006.01) | |
| *C04B 103/24* | (2006.01) | |
| *C04B 111/00* | (2006.01) | |
| *C04B 103/40* | (2006.01) | |
| *C04B 103/00* | (2006.01) | |

(52) U.S. Cl.
CPC ............ *C04B 28/28* (2013.01); *C04B 24/42* (2013.01); *C04B 28/02* (2013.01); *C04B 28/24* (2013.01); *C04B 40/0032* (2013.01); *C04B 40/0039* (2013.01); *C04B 40/029* (2013.01); *C04B 2103/0051* (2013.01); *C04B 2103/24* (2013.01); *C04B 2103/408* (2013.01); *C04B 2111/00155* (2013.01); *C04B 2201/05* (2013.01)

(58) Field of Classification Search
CPC ......... C04B 24/02; C04B 28/02; C04B 28/24; C04B 28/28; C04B 40/0032; C04B 40/0039; C04B 40/029; C04B 2103/0051; C04B 2103/24; C04B 2103/408; C04B 2201/05; C04B 2111/00155
See application file for complete search history.

(56) References Cited

U.S. PATENT DOCUMENTS

| | | |
|---|---|---|
| 4,002,590 A | 1/1977 | Yoshida et al. |
| 5,584,921 A | 12/1996 | Wagner et al. |
| 6,454,632 B1 | 9/2002 | Jones et al. |
| 7,544,726 B2 | 6/2009 | Greenwood |
| 8,048,218 B2 | 11/2011 | Nakamura et al. |
| 8,129,461 B2 | 3/2012 | Xenopoulos et al. |
| 8,999,056 B1 | 4/2015 | Hills et al. |
| 9,120,961 B2 | 9/2015 | Li et al. |
| 9,187,647 B2 * | 11/2015 | Greenwood ........... B82Y 30/00 |
| 9,303,182 B2 | 5/2016 | Wang et al. |
| 9,523,022 B2 | 12/2016 | Johnson et al. |
| 9,579,764 B1 | 2/2017 | Wetherell et al. |
| 9,624,130 B2 | 4/2017 | Kuo et al. |
| 10,093,821 B2 * | 10/2018 | Xu ........................... C09D 5/02 |
| 10,160,875 B2 * | 12/2018 | Wu ........................... C09D 7/62 |
| 2004/0044165 A1 * | 3/2004 | Barancyk ........... C08G 18/4692 528/25 |
| 2012/0059089 A1 * | 3/2012 | Greenwood ........... B82Y 30/00 523/455 |
| 2015/0203408 A1 | 7/2015 | Stroka et al. |
| 2017/0334089 A1 * | 11/2017 | Rieder ..................... B28B 7/46 |

FOREIGN PATENT DOCUMENTS

| | | | |
|---|---|---|---|
| EP | 3053901 A1 * | 8/2016 | ........... C04B 41/009 |
| WO | 2015082409 | 6/2015 | |

* cited by examiner

*Primary Examiner* — Anthony J Green
(74) *Attorney, Agent, or Firm* — Craig K. Leon; Nilay J. Choksi

(57) ABSTRACT

The present invention provides an admixture composition comprising a liquid suspension of colloidal silica, siloxane, and polycarboxylate polymer cement dispersant for enhancing early age strength, finishability, and other properties in hydratable cementitious compositions such as concrete (e.g., shotcrete). An inventive method involves mixing the components together in a specific sequence, thereby to obtain a stable liquid suspension. This attainment of a stable liquid suspension is surprising and unexpected because (i) the polycarboxylate polymer cement dispersant and siloxane components are incompatible and immiscible with one another; and (ii) that colloidal silica and siloxane compound are incompatible and immiscible with one another. Yet, the present inventors achieved an additive in the form of a stable liquid suspension which can be conveniently dosed into concretes and shotcrete mixtures, to enhance early age strength, and to improve workability and rheology in terms of finishability of concrete surfaces and improved rebound performance in shotcrete applications.

25 Claims, 6 Drawing Sheets

*Fig. 3A*  *Fig. 3B*  *Fig. 3C*
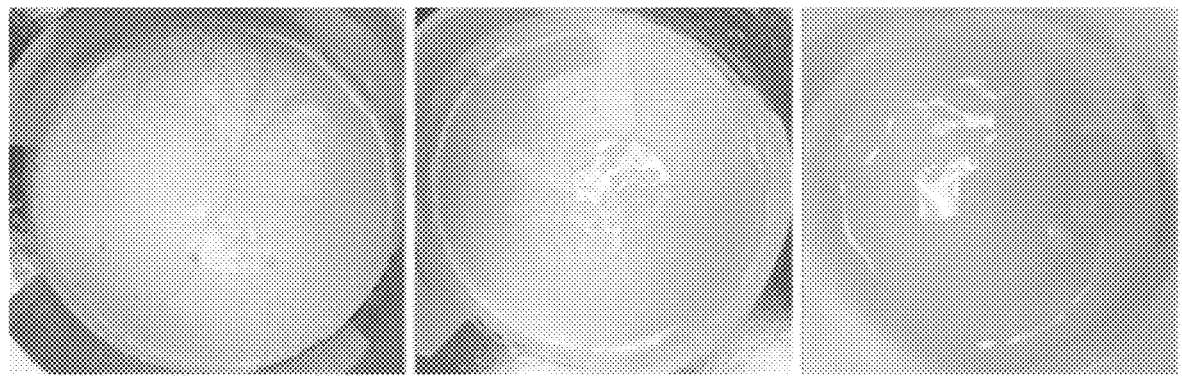
*Fig. 4A*  *FIG. 4B*  *FIG. 4C*

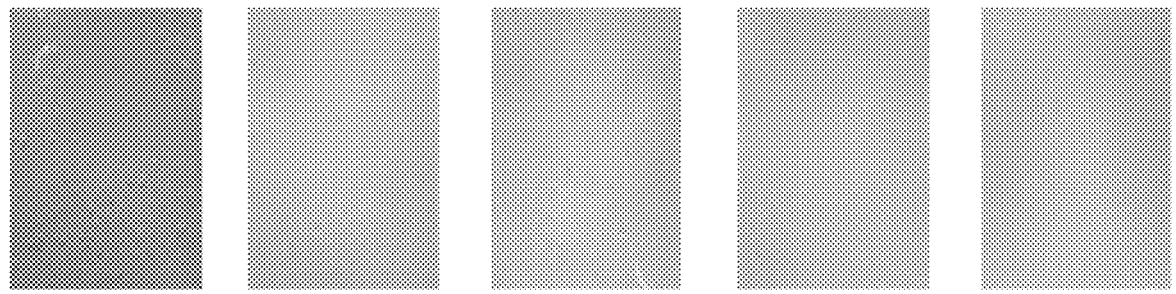
*Fig. 9A*   *Fig. 9B*   *Fig. 9C*   *Fig. 9D*   *Fig. 9E*
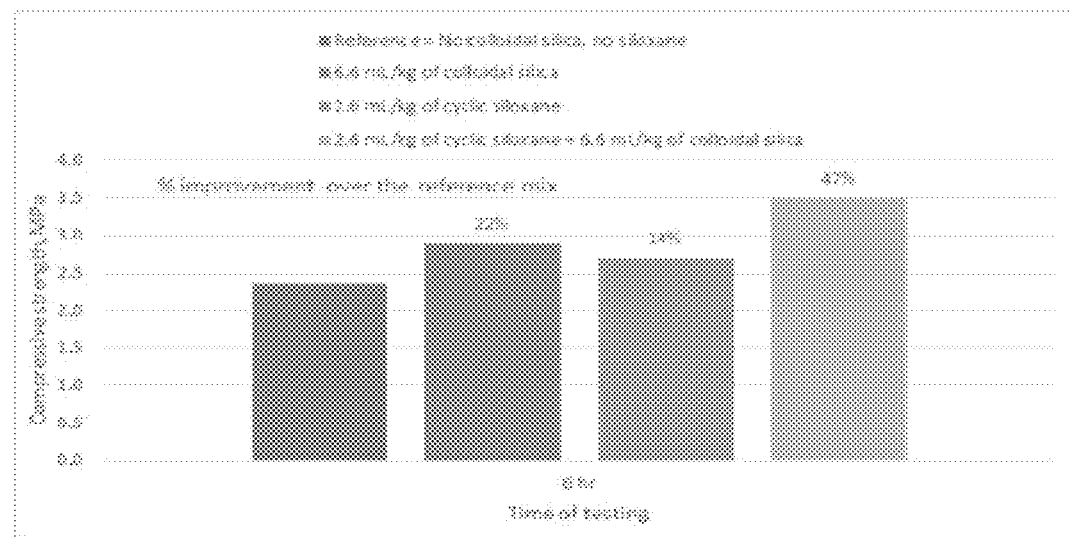
*Fig. 10*

EARLY STRENGTH ENHANCING CONCRETE ADMIXTURE

FIELD OF THE INVENTION

This invention relates to the use of chemical admixtures for preparations containing cementitious binders; and, more particularly, to the use in shotcrete, or other concretes or mortars, of an admixture composition comprising colloidal silica, siloxane, and polycarboxylate polymer cement dispersant.

BACKGROUND OF THE INVENTION

It is known to use set accelerating chemical admixtures to improve early strength in cementitious mixtures such as shotcrete. For example, depending on the mix design, set accelerators have achieved a two MegaPascal (MPa) of compressive strength in shotcrete mixtures within three hours after application.

Due to fast set acceleration, such chemical admixtures achieve desired early strength; but, unfortunately, they also bring about a number of disadvantages. These disadvantages include rebound waste of the shotcrete, consolidation and compaction issues, as well as long-term strength concerns and decreased plasticity (e.g., zero slump) of the shotcrete mixture.

The industry has been using silica fume or colloidal silica, due to a pozzolanic effect on early strength enhancement of cement binder, or, as another example, due to reduced rebound in shotcrete applications. However, the high surface area of silica increases water demand in cementitious mixes, reduces workability, and increases viscosity, all of which adversely affect pumpability of cementitious mixes.

The construction industry actively seeks a solution that can not only improve the early-age strength development and rebound reduction achieved with colloidal silica, but also that can offset the impact of any set accelerator, which is otherwise detrimental to the performance of the cementitious mixes. Applicants believe that industry demand for even faster strength development should be addressed. For example, the industry is using shotcrete increasingly for ground support purposes, in temporary as well as permanent excavation structures, and for mining and tunneling applications. Moreover, architects and engineers appear to be relying increasingly upon shotcrete to carry immense loads and to provide structural integrity at faster speeds. Thus, early-age strength enhancement is desirable for achieving safety as well as productivity goals. The present inventors believe that even the smallest improvements in early-age strength enhancement can help to obtain significant benefits in all of these areas, particularly in time-sensitive applications where strength gain rate is crucial to ensure structural integrity in underground environment for safety.

There continues to be a need for supplementary additives to enhance early-age strength and also to offset the detrimental impact of accelerators on rebound in shotcrete applications, as well as to achieve compaction properties in hydratable cementitious systems as a whole.

SUMMARY OF THE INVENTION

In surmounting the disadvantages of the prior art, the present invention provides an additive composition for hydratable cementitious mixtures, which comprises a stable liquid suspension comprising a polycarboxylate polymer dispersant, at least one colloidal silica solution, and at least one siloxane compound.

Surprisingly and unpredictably, the present inventors achieved a stable liquid suspension despite the fact that (1) polycarboxylate polymer is not compatible or miscible with the siloxane compound; and also despite the fact that (2) colloidal silica is not compatible or miscible with the colloidal silica, as illustrated, respectively, in FIGS. 1 and 2, as discussed in further detail hereinafter.

An exemplary additive composition of the invention for modifying hydratable cementitious compositions, such as concrete and shotcrete, comprises: a liquid suspension comprising (A) a polycarboxylate polymer cement dispersant, (B) at least one colloidal silica solution having an average silica particle size of 5 to 150 nanometers and being dispersed within an aqueous or non-aqueous solution, wherein the dry-weight of the colloidal silica solution is present in the amount of 1% to 54% by weight (dry) based on the total weight of the liquid suspension, and (C) at least one siloxane compound; the dry-weight of polycarboxylate polymer cement dispersant of component (A) being present in an amount no less than 1.5% and no greater than 50% by weight (dry) based on the total weight of the liquid suspension; and the wet-weight of siloxane compound of component (C) being present in an amount no less than 5% and no greater than 50% by weight (wet) based on the total weight of the liquid suspension; and wherein components (A) and (B) are first blended together to obtain a uniform colloidal dispersion; and, thereafter, component (C) is mixed into the obtained uniform colloidal dispersion to form the liquid suspension.

An exemplary method of the invention for making the additive composition comprises: mixing together a polycarboxylate polymer cement dispersant and colloidal silica to obtain a blended colloidal dispersion; and, thereafter, mixing into the blended colloidal dispersion at least one siloxane compound to obtain a liquid suspension, the polycarboxylate polymer being present in an amount no less than 1.5% and no greater than 50% by weight (dry) based on total weight of the liquid suspension; the colloidal silica being present in an amount no less than 1% and no greater than 54% by weight (dry) based on total weight of the liquid suspension, the silica particles having an average particle size of 5 to 150 nanometers; and the at least one siloxane compound being present in an amount no less than 5% and no greater than 50% by weight (wet) based on total weight of the liquid suspension.

The present invention also provides cementitious compositions comprising the foregoing additive composition, and method for modifying cementitious compositions, based on use of the above-described liquid suspension, as well as a method of applying concrete containing the above-described liquid suspension of components.

The present inventors believe that the use of the stable liquid suspension to incorporate the siloxane compound into the matrix of the cementitious material has benefits in terms of reduced rebound, improved strength, and enhanced finish-ability in, and in the visual appearance of, the surface of the concrete, shotcrete, or other cementitious materials that contain the additive composition.

Further advantages and features of the invention are described hereinafter.

BRIEF DESCRIPTION OF THE DRAWINGS

An appreciation of the benefits and features of the present invention may be more readily comprehended by considering the following written description of exemplary embodiments in conjunction with the drawings, wherein

FIGS. 3A, 3B, and 3C are three photographs that shows the importance of addition order of mix components, set forth in triptych manner, wherein the left-most photograph (FIG. 3A) depicts a homogeneous blend (with no phase separation) of colloidal silica (step 1), polycarboxylate polymer (step 2), siloxane (step 3); the center photograph (FIG. 3B) depicts phase separation of Polycarboxylate (step 1), siloxane (step 2), colloidal silica (step 3); and the right-most photograph (FIG. 3C) depicts phase separation of colloidal silica (step 1), siloxane (step 2), and polycarboxlate polymer (step 3);

FIGS. 4A, 4B, and 4C are three photographs, set forth in triptych manner, depicting the various impacts on viscosity, as effectuated by various colloidal silica particle sizes and total solids concentration in a liquid additive;

FIGS. 9A, 9B, 9C, 9D, and 9E are photographs of concrete surfaces prepared using same mix design but applied through different application methods; and FIG. 10 is a bar graph which illustrates percentage improvement in terms of compressive strength over time, of a concrete containing both siloxane and colloidal silica, as compared to control concrete samples which either contained no siloxane or colloidal silica, or only one of either siloxane or colloidal silica.

DETAILED DESCRIPTION OF EXEMPLARY EMBODIMENTS

The term "cement" refers to hydratable cement produced by pulverizing clinker consisting of hydraulic calcium silicates and one or more forms of calcium sulfate (e.g., gypsum). The term "mortar" refers to a cement pastes formed with water and additionally including fine aggregate (e.g., sand); while the term "concrete" refers to mortars which additionally include coarse aggregate (e.g., crushed stones or gravel).

The term "cementitious" as used herein refers to materials that include or comprise cement (e.g., Portland cement) or which otherwise function as a binder to hold together fine aggregates (e.g., sand), coarse aggregates (e.g., crushed stones, gravel), or mixtures thereof. Typically, Portland cement is combined with one or more other supplementary cementitious materials ("SCMs") and provided as a blend. SCMs may include limestone, hydrated lime, fly ash, granulated blast furnace slag, and silica fume, or other materials. The cementitious binder materials in concretes (shotcrete) and mortars which can be modified by additive compositions and methods of the invention can include other cements and cementitious materials as well, such as calcium aluminate cement, calcium sulfoaluminate cement, and/or supplementary cementitious materials, such as silica fume, metakaolin, clay, limestone powder, gypsum, kaolin, calcined clay, calcined kaolin, rice husk ash, or mixtures of these.

The term "hydratable" as used herein is intended to refer to cement, mortar, concrete (including shotcrete), or other cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

As mentioned in the Summary, the present invention provides a stable suspension of polycarboxylate polymer cement dispersant, colloidal silica, and siloxane compound. This was surprising and unexpected, in view of the fact that (1) polycarboxylate polymer is not compatible or miscible with the siloxane compound; and also despite the fact that (2) colloidal silica is not compatible or miscible with the colloidal silica.

Figure 1:
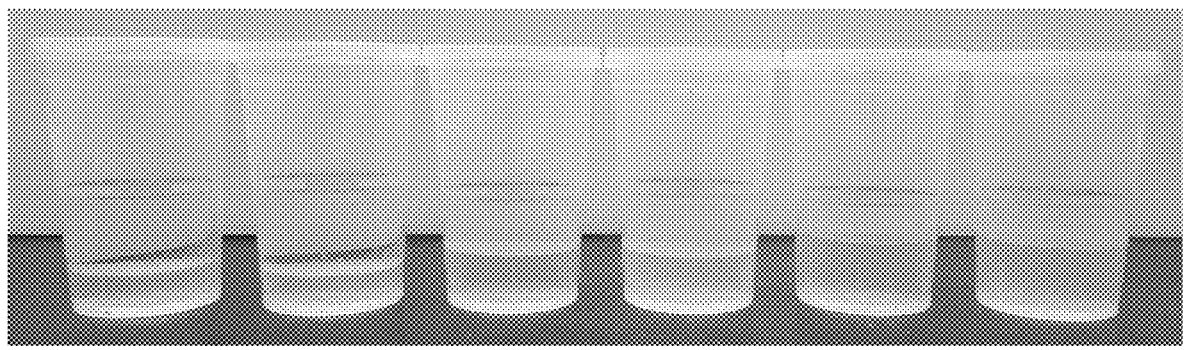
FIG. 1 is a photograph of various liquid suspensions made by different combinations of polycarboxylate polymer and a linear or cyclic siloxane, each of which resulted in non-miscibility and separation (from left to right: 33% polycarboxylate by wet weight [19.8% by dry weight] of the total weight of the liquid suspension+67% cyclic siloxane by wet weight of the total weight of the liquid suspension; 33% polycarboxylate by wet weight [19.8% by dry weight] of the total weight of the liquid suspension+67% linear siloxane by wet weight of the total weight of the liquid suspension; 50% polycarboxylate by wet weight [30% by dry weight] of the total weight of the liquid suspension+50% cyclic siloxane by wet weight of the total weight of the liquid suspension; 50% polycarboxylate by wet weight [30% by dry weight] of the total weight of the liquid suspension+50% linear siloxane by wet weight of the total weight of the liquid suspension; 67% polycarboxylate by wet weight [40.2% by dry weight] of the total weight of the liquid suspension+33% cyclic siloxane by wet weight of the total weight of the liquid suspension; 67% polycarboxylate by wet weight [40.2% by dry weight] of the total weight of the liquid suspension+33% linear siloxane by wet weight of the total weight of the liquid suspension.

As illustrated in FIG. 1, various combinations of polycarboxylate polymer and siloxane compounds were combined, in various ranges and using both cyclic and linear forms of siloxane compounds, but all were found to separate immediately. From left to right, these samples were as follows: (i) polycarboxylate (19.8% by dry weight of the total weight of the liquid suspension) and cyclic siloxane (67% by wet weight of the total weight of the liquid suspension); (ii) polycarboxylate (19.8% by dry weight of the total weight of the liquid suspension) and linear siloxane (67% by wet weight of the total weight of the liquid suspension); (iii) polycarboxylate (30% by dry weight of the total weight of the liquid suspension) and cyclic siloxane (50% by wet weight of the total weight of the liquid suspension); (iv) polycarboxylate (30% by dry weight of the total weight of the liquid suspension) and linear siloxane (50% by wet weight of the total weight of the liquid suspension); (v) polycarboxylate (40.2% by dry weight of the total weight of the liquid suspension) and cyclic siloxane (33% by wet weight of the total weight of the liquid suspension); and (vi) polycarboxylate (40.2% by dry weight of the total weight of the liquid suspension) and linear siloxane (33% by wet weight of the total weight of the liquid suspension).

Figure 2:
FIG. 2 is a photograph of an attempted combination of siloxane and colloidal silica, which resulted in non-miscibility and separation.

Similarly, as shown in FIG. 2, the attempted combination of siloxane and colloidal silica resulted in very clear separation. The photograph illustrates that these components are immiscible and highly incompatible.

Surprisingly, however, when the inventors combined polycarboxylate with colloidal silica to achieve a uniform colloidal dispersion, and thereafter added the siloxane, they achieved a homogeneous and stable liquid suspension, as shown in FIG. 3A. This was unexpected and unpredictable given that sequential addition of (1) polycarboxylate then (2) siloxane followed by (3) colloidal silica resulted in a three-part phase separation, as shown in FIG. 3B; and also given that sequential addition of (1) colloidal silica then (2) siloxane followed by (3) polycarboxylate also resulted in a three-part phase separation, as shown in FIG. 3C.

It is noted by the inventors that, as shown in FIG. 3A, their preference is to place the colloidal silica first into a container (e.g., beaker, mixing vessel) and thereafter introduce the polycarboxylate component into the colloidal silica (as it makes for better technique to add the smaller aliquot into the larger volume component); but, for purposes of commercial production, the inventors believe these two components could be introduced simultaneously, or, in any order into the mixing vessel or container, so long as these two components are blended together first to establish a uniform and homogenous mixed colloidal suspension, before introducing the siloxane compound to obtain the liquid suspension additive composition of the invention.

During experimentation, the present inventors noticed that there is a delicate balance between the three components (A), (B), and (C) in terms of their type, grade, and dosage rate, and how these can affect the viscosity and stability of the admixture composition. For example, it was unexpected that the grade of the colloidal silica affected the stability of the admixture composition, wherein colloidal silica grades having particle size ranging from 20 nanometer to 25 nanometer or from 80 nanometer to 95 nanometer were found to be the most ideal selections to avoid gel-like material. For present purposes, a gel state will be defined herein as viscosity higher than 7000 cP as measured with Brookfield LV, spindle 64, 60 revolutions per minute (rpm), 21° C. sample and ambient temperature. Moreover, the present inventors also unexpectedly discovered that there is a minimum percentage of polycarboxylate polymer required in the admixture composition to prevent gel formation, wherein formulations made with less than 5% to 10% polycarboxylate polymer by dry weight tended to form gels regardless of the selected colloidal silica grade.

As shown in the photographs of FIGS. 4A, 4B, and 4C, the various impacts on viscosity of admixture compositions (containing all components (A), (B), and (C)) are shown. FIG. 4A illustrates the effect of using colloidal silica grade of 5 nm particle size and 15% total solids concentration. FIG. 4B illustrates colloidal silica grade of 8 nm particle size and 30% total solids concentration. FIG. 4C illustrates colloidal silica grade of 35 nm particle size and 50% total solid concentration.

Figure 5:
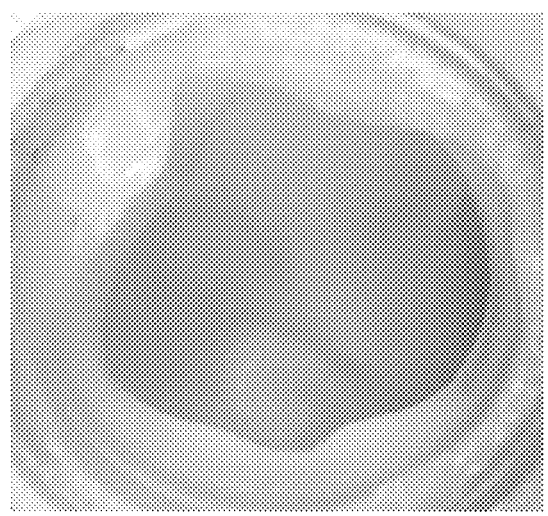
FIG. 5 is a photograph of a gel-like admixture composition illustrating the effect of dosage rate of polycarboxylate polymer component on viscosity of the admixture composition.

As shown in FIG. 5, the dosage rate of polycarboxylate polymer component can have a significant effect on the viscosity of the admixture formulations of the invention. To achieve a flowable, non-gel like admixture (having viscosity less than 7000 cP as measured with Brookfield LV, spindle 64, 60 rpm, 21° C. sample and ambient temperature), the admixture composition should incorporate polycarboxylate polymer cement dispersant in the range of 1.5% to 50% by dry weight based on total weight of the liquid suspension; more preferably, in the amount of 4.5% to 24.5% by dry weight based on total weight of the liquid suspension; and, most preferably, in the amount of 6% to 21% by dry weight based on total weight of the liquid suspension. For example, formulations containing 10% of polycarboxylate polymer tend to become gel-like (viscosity higher than 7000 centipoise (cP) measured with Brookfield LV, spindle 64, 60 rpm, 21° C. sample and ambient temperature), as shown in FIG. 5, where gel formation of the admixture composition is seen around the inner circumference of the container.

Colloidal Silica.

Exemplary colloidal silica, as contemplated for use in the present invention, should comprise ultra-fine silicon dioxide particles that are suspended in a liquid wherein particle sizes range between 5 to 150 nanometers; more preferably, 15 to 95 nanometers.

Exemplary total solids concentration should be 10% and 60%, and more preferably 15% to 50%, depending on the particle size, wherein higher concentrations (equal or higher than 50% total solids) contain particle sizes larger than 20 nanometers, are slightly preferred over lower concentrations (equal or lower than 30% total solid) in which particle sizes are as small as 5 nanometers.

Although the inventors believe the particle size range of 15 to 150 nm to be workable, formulation conditions and source quality could well dictate the preferred range size to be used. The present inventors found colloidal silica particle sizes in the 14 to 30 nm as well as in 80 to 95 nm range helped to avoid creating gel-like admixture compositions, and thus believe that particle sizes between these ranges, and above those tested should also help to avoid creating gels.

The admixture composition should incorporate colloidal silica solution in the range of 1% to 54% by dry weight based on total weight of the liquid suspension; more preferably, in the amount of 3% to 42% by dry weight based on total weight of the liquid suspension; and, most preferably, in the amount of 4% to 36% by dry weight based on total weight of the liquid suspension.

The pH of exemplary colloidal silica can be 1 to 13, more preferably 6 to 12, and most preferably between 7 and 11.

Polycarboxylate Polymer Cement Dispersants.

Polycarboxylate polymer cement dispersants are often referred to as high range water reducers ("HRWR") because they allow for a large reduction (e.g., 12% to 15% or more) in the water otherwise required to obtain a given workability (or slump) value in a concrete mix design. The present inventors believe that a number of HRWR polycarboxylate polymers are available which could be suitable for the uses contemplated by the present invention. Generally, polycarboxylate polymer dispersants function to disperse cement particles within aqueous slurries and pastes because they contain carboxylic groups for attaching to cement particles as well as oxyalkylene groups (e.g., ethylene oxide, propylene oxide) to maintain a desired hydrophilic/hydrophobic balance. These are sometimes referred to as "comb" polymers, as carboxyl-group-containing monomers are typically used to form a backbone structure to which pendant chains of polyethylene oxide (EO), polypropylene oxide (PO), or a mixture of EO/PO groups are attached typically through ester, amide, and/or ether linkages. Preferred are polycarboxylate comb-type polymer HRWR cement dispersants in the form of polyacrylate aqueous solutions based on ester or ether linking groups with primarily polyethylene side-chain groups. Polycarboxylate cement dispersing polymers having HRWR function are known (See e.g., U.S. Pat. No. 6,187,841 of Tanaka et al. (MBT); U.S. Pat. No. 6,569,234 of Yamashita et al. (NSK)); U.S. Pat. Nos. 6,441,054 and 7,972,436 of GCP Applied Technologies Inc., the common assignee hereof). The present inventors also believe that superplasticizer formulations (HRWR) available from GCP Applied Technologies Inc. (Cambridge, Mass., USA) under the ADVA® product name would also be suitable for the purposes of the present invention, which may further comprise additional admixtures (e.g., defoaming agents, air entraining agents, clay mitigation agents) according to the preferences or needs of the end user, In various exemplary aspects of the invention, as will be detailed hereinafter, the additive composition may comprise one or more air detraining agents (defoamer), one or more air entraining agents, or a combination of such agents, for the purpose of managing size and uniformity of distribution of air voids desired in a resultant concrete or mortar material. Exemplary methods of the invention may include addition of such air management agents in the polycarboxylate polymer portion added to the colloidal silica as a preferred manner of addition. Alternatively, such air management agents can be incorporated after addition of the polycarboxylate portion, or after Components A, B, and C have been uniformly mixed together.

Siloxane Compounds.

Siloxane compounds having linear and cyclic structures are believed to be useful in the various exemplary additive compositions and methods of the invention. The chosen silicone molecules are not intended to react with any chemical in the mixture, or to start a polymerization reaction; and thus the groups attached to the silicones should not be polymerizable. Thus, in preferred exemplary embodiments, the liquid suspensions described herein should be substantially devoid of initiators, catalysts, and cross-linking agents. The inventors provide some examples, which are structurally representative but by no means exhaustive, of siloxane compounds determined to be suitable for use in compositions and methods of the invention.

Name: Hexamethylcyclotrisiloxane (D3); Molecular formula: $C_6$—$H_{18}$—$O_3$—$Si_3$; Molecular weight: 222.46 g/mol; Structure:

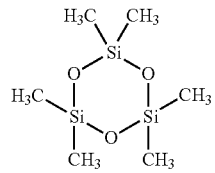

Name: Octamethylcyclotetrasiloxane (D4); Molecular formula: C8-H24-O4-Si4; Molecular weight: 296.64 g/mol; Structure:

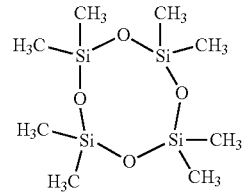

Name: Decamethylcyclopentasiloxane (D5); Molecular formula: C10-H30-O5-Si5; Molecular weight: 370.80 g/mol; Structure:

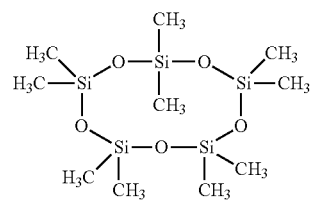

Name: Dodecamethylcyclohexasiloxane (D6); Molecular formula: C12-H36-O6-Si6; Molecular weight: 444.93 g/mol; Structure:

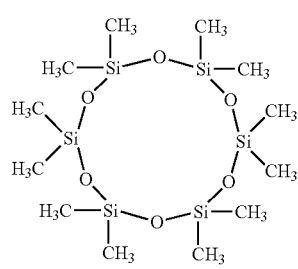

Name: Tetradecamethylcycloheptasiloxane (D7); Molecular formula: C14-H42-O7-Si7; Molecular weight: 519.078 g/mol; Structure:

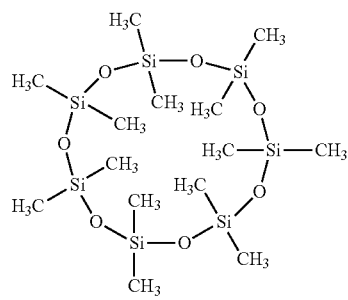

Name: Hexamethyldisiloxane (L2); Molecular formula: C6-H18-O—Si2; Molecular weight: 162.379 g/mol; Structure:

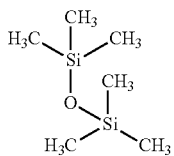

Name: Octamethyltrisiloxane (L3); Molecular formula: C8-H24-O2-Si3; Molecular weight: 236.533 g/mol; Structure:

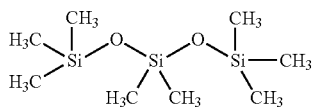

Name: Decamethyltetrasiloxane (L4); Molecular formula: C10-H30-O3-Si4; Molecular weight: 310.687 g/mol; Structure:

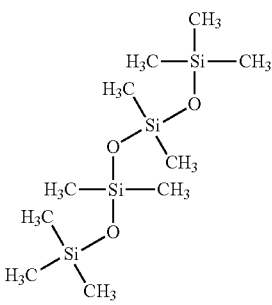

Name: Dodecamethylpentasiloxane (L5); Molecular formula: C12-H36-O4-Si5; Molecular weight: 384.841 g/mol; Structure:

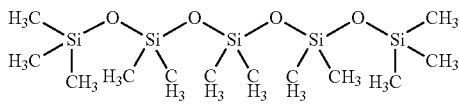

Name: Tetradecamethylhexasiloxane (L6); Molecular formula: C14-H42-O5-Si6; Molecular weight: 458.995 g/mol; Structure:

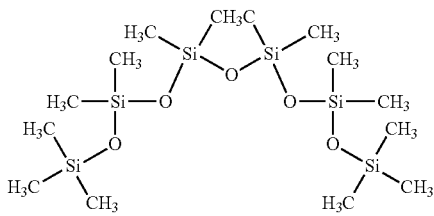

Various exemplary aspects of the present invention are thus contemplated by the inventors as follows.

In a first exemplary aspect, the invention provides an additive composition for hydratable cementitious mixtures, comprising: a liquid suspension comprising (A) a polycarboxylate polymer cement dispersant, (B) at least one colloidal silica solution having an average silica particle size of 5 to 150 nanometers and being dispersed within an aqueous or non-aqueous solution, wherein the dry-weight of the colloidal silica solution is present in the amount of 1% to 54% by weight (dry) based on the total weight of the liquid suspension, and (C) at least one siloxane compound; the dry-weight of polycarboxylate polymer cement dispersant of component (A) being present in an amount no less than 1.5% and no greater than 50% by weight (dry) based on the total weight of the liquid suspension; and the wet-weight of siloxane compound of component (C) being present in an amount no less than 5% and no greater than 50% by weight based on the total weight of the liquid suspension; and wherein components (A) and (B) are first blended together to obtain a uniform colloidal dispersion; and, thereafter, component (C) is mixed into the obtained uniform colloidal dispersion to form the liquid suspension.

In a second aspect, which is based on the first exemplary aspect described above, the invention provides an additive composition wherein, in the siloxane compound, silicon atoms and oxygen atoms are linked within a linear or cyclic backbone structure.

In a third aspect, which is based on any of the first through second exemplary aspects described above, the invention provides an additive composition wherein the siloxane compound has a linear backbone structure represented by Formula I Formula (I)

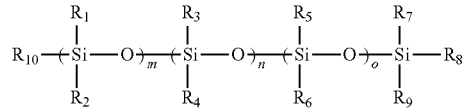

or a cyclic backbone structure represented by Formula II

Formula (II)

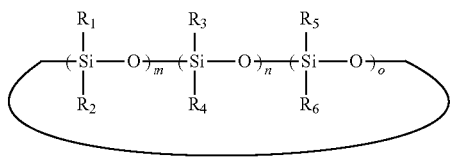

wherein $R_1$, $R_2$, $R_3$, $R_4$, $R_5$, $R_6$, $R_7$, $R_8$, and $R_9$ each independently represent hydrogen, halogen, epoxy, alkyl, amino, amido, alyloxy, alkoxy, ketoximate, acyloxy, acid amido, or aminoxy groups; and m, n, and o each independently represent an integer; and, wherein in Formula I, the sum of m+n+o=2-10; m is 1-10, n is 0-9, and o is 0-9, and, in Formula II, the sum of m+n+o=3-10; m is 1-10, n is 0-7, and o is 0-7.

In a fourth aspect, which is based on any of the first through third exemplary aspects described above, the invention provides an additive composition of wherein the siloxane compound is a cyclic dimethylsiloxane.

In a fifth aspect, which is based on any of the first through fourth exemplary aspects described above, the invention provides an additive composition wherein the siloxane compound is a cyclic compound chosen from hexamethylcyclotrisiloxane, octamethylcyclotetrasiloxane, decamethylcyclo-pentasiloxane, dodecamethylcyclo-hexasiloxane, tetradecamethylcyclohepta-siloxane, and mixtures thereof.

In a sixth aspect, which is based on any of the first through fifth exemplary aspects described above, the invention provides an additive composition wherein the siloxane compound is a cyclic compound chosen from octamethyl-cyclotetrasiloxane, decamethylcyclo-pentasiloxane, dodecamethylcyclohexasiloxane, and tetradeca-methylcycloheptasiloxane, and mixtures thereof.

In a seventh aspect, which is based on any of the first through sixth exemplary aspects described above, the invention provides an additive composition wherein the siloxane compound is a cyclic compound chosen from decamethylcyclopentasiloxane, dodecamethyl-cyclohexasiloxane, and mixture thereof.

In an eighth aspect, which is based on any of the first through seventh exemplary aspects described above, the invention provides an additive composition wherein the siloxane compound is a linear siloxane.

In a ninth aspect, which is based on any of first, second, third, or eighth exemplary aspects described above, the invention provides an additive composition wherein the siloxane compound is a linear siloxane chosen from hexamethyldisiloxane, octamethyltrisiloxane, decamethyltetrasiloxane, dodeca-methylpentasiloxane, and tetradecamethylhexasiloxane, and mixtures thereof.

In a tenth aspect, which is based on any of first, second, third, eighth, or ninth exemplary aspects described above, the invention provides an additive composition wherein the siloxane compound is a linear siloxane chosen from octamethyltrisiloxane, decamethyltetrasiloxane, dodecamethylpentasiloxane, tetra-decamethylhexasiloxane, and mixtures thereof.

In an eleventh aspect, which is based on any of first, second, third, eighth, ninth, or tenth exemplary aspects described above, the invention provides an additive composition wherein the siloxane compound is a linear siloxane chosen from decamethyltetrasiloxane, dodecamethylpentasiloxane, and mixture thereof.

In a twelfth aspect, which is based on any of first through eleventh exemplary aspects described above, the invention provides an additive composition wherein components (A), (B), and (C) are present in the liquid suspension in the following ratios: (A) 1.5% to 50% by dry weight of the total weight of liquid suspension; (B) 1% to 54% by dry weight of the total weight of liquid suspension; and (C) 5% to 50% by wet weight of the total weight of liquid suspension; and, more preferably, in the ratios: (A) 4.5% to 24.5% by dry weight of the total weight of liquid suspension; (B) 3% to 42% by dry weight of the total weight of liquid suspension; and (C) 15% to 35% by wet weight of the total weight of liquid suspension; and, most preferably, in the ratios: (A) 6% to 21% by dry weight of the total weight of liquid suspension; (B) 4% to 36% by dry weight of the total weight of liquid suspension; and (C) 20% to 30% by wet weight of the total weight of liquid suspension.

In a thirteenth aspect, which is based on any of first through twelfth exemplary aspects described above, the invention provides an additive composition further comprising a conventional concrete admixture chosen from a water reducer, set accelerator, set retarder, strength enhancing agent, air detraining agent (e.g., defoamer), air entraining agent, shrinkage reducing admixture, or a mixture thereof.

For example, an exemplary additive composition or method of the invention may further include the use of a water reducer selected from the group consisting of lignosulfonates, naphthalene sulfonate formaldehyde condensates, melamine sulfonate formaldehyde condensates, a gluconic acid or gluconate, corn syrup, or a mixture thereof. Still further exemplary embodiments may include the use of at least one strength enhancer. For example, the strength enhancers may be an alkanolamine, and more preferably a tertiary alkanolamine selected from triethanolamine, triisopropanolamine, diethanol isopropanolamine, ethanol diisopropanolamine, tetra(hydroxyethyl) ethylene diamine, tetra (hydroxypropyl) ethylene diamine, methyl diethanolamine, or mixture thereof. As many or most of these tend to entrain air in the cementitious mixture, the use of an air detraining agent (e.g., defoamer) would be preferred.

Still further exemplary additive composition or method of the invention may further include air entraining agent, air detraining agent, or mixture thereof. For example, In U.S. Pat. Nos. 5,665,158 and 5,725,657 (owned by the common assignee hereof), Darwin et al. disclosed the use of oxyalkylene amine-based defoaming agents for use with polycarboxylate superplasticizers. In U.S. Pat. No. 6,139,623 (owned by the common assignee hereof), Darwin et al. disclosed polycarboxylate superplasticizers emulsified with antifoaming agent using a surfactant to stabilize the emulsified superplasticizer and antifoaming agent. The antifoaming agent could be selected from phosphate esters (e.g., dibutylphosphate, tributylphosphate), borate esters, silicone derivates (e.g., polyalkyl siloxanes), and polyoxyalkylenes having defoaming properties. In U.S. Pat. No. 6,858,661 (owned by the common assignee hereof), Zhang et al. disclosed a polycarboxylate water-reducer and a tertiary amine defoamer having an average molecular weight of 100-1500 for creating a stable admixture formulation and helping to achieve a controllable level of entrained air in the concrete mix. In U.S. Pat. No. 6,545,067 (owned by BASF), Buchner et al. disclosed mixtures of polycarboxylate superplasticizer and butoxylated polyalkylene polyamine as a defoamer for reducing the air pore content of cement mixes. In U.S. Pat. No. 6,803,396 (also owned by BASF), Gopalkrishnan et al. disclosed mixtures of polycarboxylate superplasticizer and air-detraining agents. The air detrainers were based on low molecular weight block polyether polymers described as containing ethylene oxide and propylene oxide units and described as being initiated using reactive diamine or glycol groups. In U.S. Pat. No. 6,569,924 (owned by MBT Holding AG), Shendy et al. disclosed the use of polycarboxylate dispersants, a water-insoluble defoamer, and a solubilizing agents for solubilizing the water-insoluble defoamer. Such solubilizing agents functioned by increasing the amount of oil component within the aqueous phase. A similar approach was taken in U.S. Pat. No. 6,875,801 wherein Shendy et al. described using amine solubilizing agents for stabilizing water-insoluble defoamers. In U.S. Pat. No. 8,187,376, Kuo et al. disclosed a polyalkoxylated polyalkylene polyamine defoamer, which could be deployed with one or more air entraining agents, including oxyalkylene-containing superplasticizers, or other air entraining agents. In US 2016/0340248, Chen and Kuo disclosed a polyalkoxylated polyamine oxide defoaming composition.

The present inventors believe that relative amounts of additional conventional admixture components can be incorporated in amounts as desired. However, it is preferable to add such components independently after the liquid suspension of components (A), (B), and (C) has been established. Additional conventional admixture components, as another example, may include one or more of the following, chosen from biocides, amines, silane, fumed silica, precipitated silica, nanosilica, hydrated alumina, magnesium silicate, calcium silicate, magnesium hydroxide, lime, gypsum, pH stabilizers, 2-Acrylamido-2-methylpropane sulfonic acid (AMPS), glycol, glycerin, clay-based materials such as sepiolite and attapulgite, melamine sulfonate, lignin sulfonate, sodium gluconate, naphthalene sulfonate, lithium silicate, methylcellulose, xanthan gum, guar gum, welan gum, diutan gum, strength enhancers (See alkanolamines and others as discussed above), set accelerators, set retarders, shrinkage reducing agents, crack control agents, expansive agents, air-entraining admixtures, air detrainers, water-reducers, viscosity modifying agents, corrosion inhibitors, integral waterproofing admixtures, water repellents, curing compounds, permeability reducing admixtures, alkali-silica reaction mitigating admixtures, efflorescence reducing admixtures, pigments, and mixtures thereof.

In a fourteenth aspect, which is based on any of the first through thirteenth exemplary aspects described above, the invention provides an additive composition wherein the liquid suspension comprising components (A), (B), and (C) has a viscosity of at least 500 cP and a viscosity no greater than 6000 centipoise (cP), as measured by Brookfield Viscometer LV, spindle 64, 60 rpm, 21° C. sample, at ambient temperature. More preferably, the viscosity is 750 to 3000 cP, and most preferably 1000 to 1500 cP.

In a fifteenth aspect, the invention is a composition comprising a cementitious binder and the additive composition according to any of the first through fourteenth aspects described above. The cementitious binder may include Portland cement and any of the supplemental cementitious materials (SCAs) discussed above; or it may be based on other cements, such as calcium aluminate cement, or other cementitious materials also discussed above. Exemplary cementitious binder material content can be within the range of 200 to 700 kilogram per cubic meter, more preferable 350 to 550, and most preferably 400 to 500 kilograms per cubic meter. The water-to-cementitious materials ratio can vary, for example, 0.25 to 0.70, more preferably 0.35 to 0.50, and most preferably 0.40 to 0.45. The cementitious composition may also, for example, contain fine aggregates (sieve size smaller than 4.75 mm), coarse aggregates (sieve size larger than 4.75 mm), micro fibers, macro fibers made of different materials such as synthetic or steel, or any mixture of the foregoing.

In a sixteenth aspect, the invention is a method for modifying a hydratable cementitious composition which comprises mixing into a hydratable cementitious composition (e.g., concrete, shotcrete, mortar, cement) the additive composition according to any of the first through fourteenth aspects described above.

In a seventeenth aspect, the invention is a method for making an additive composition for modifying hydratable cementitious compositions, comprising: mixing together a polycarboxylate polymer cement dispersant and at least one colloidal silica to obtain a blended colloidal dispersion; and, thereafter, mixing into the blended colloidal dispersion at least one siloxane compound to obtain a liquid suspension, the dry-weight of polycarboxylate polymer being present in an amount no less than 1.5% and no greater than 50% by weight (dry) based on total weight of the liquid suspension; the dry-weight of colloidal silica being present in an amount no less than 1% and no greater than 54% by weight (dry) based on total weight of the liquid suspension, the silica particles having an average particle size of 5 to 150 nanometers; and the at least one siloxane compound being present in an amount no less than 5% and no greater than 50% by weight (wet) based on total weight of the liquid suspension.

In an eighteenth aspect, which may be based on any of the foregoing first through seventeenth aspects described above, the invention provides a method wherein the mixing of the polycarboxylate polymer cement dispersant and colloidal silica to obtain the blended colloidal dispersion, and the subsequent mixing into the blended colloidal dispersion at least one siloxane compound to obtain a liquid suspension, are accomplished under the following conditions:

mixing the components at a mixing speed of 1 to 1500 rpm (more preferably ranging between 100 and 1000 rpm, and most preferably ranging between 300 and 600 rpm);

mixing the components for a period of 5 to 360 minutes (more preferably for a duration ranging between 5 to 90 minutes, and most preferably for a duration ranging between 5 to 60 minutes); and mixing the components at a temperature of −10° C. to +50° C. (and more preferably 0° C. to +35° C., and most preferably at +10° C. to +30° C.).

In a nineteenth aspect, which may be based on any of the foregoing first through eighteenth aspects described above, the invention provides a method wherein the components are mixed at a speed of 300 and 600 rpm, for a period of 5 to 60 minutes, at a temperature of +10° C. to +30° C. In other words, any partial or total combination of components (A), (B), and (C) are subjected to these ranges.

In a twentieth aspect, which may be based on any of the foregoing first through nineteenth aspects described above, the invention provides a method the siloxane compound has a linear backbone structure represented by Formula I

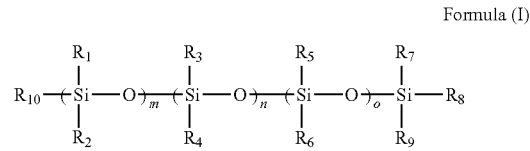

Formula (I)

or a cyclic backbone structure represented by Formula II

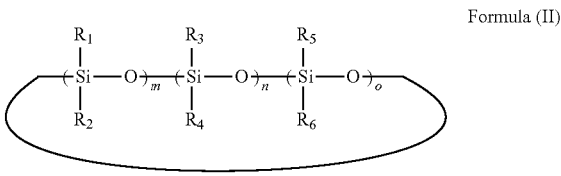

Formula (II)

wherein $R_1$, $R_2$, $R_3$, $R_4$, $R_5$, $R_6$, $R_7$, $R_8$, and $R_9$ each independently represent hydrogen, halogen, epoxy, alkyl, amino, amido, alyloxy, alkoxy, ketoximate, acyloxy, acid amido, or aminoxy groups; and m, n, and o each independently represent an integer; and, wherein in Formula I, the sum of m+n+o=2 to 10; m is 1 to 10, n is 0 to 9, and o is 0 to 9, and, in Formula II, the sum of m+n+o=3 to 10, m is 1 to 10, n is 0 to 7, and o is 0 to 7.

In a twenty-first aspect, the invention provides a method for applying shotcrete, comprising: spray-applying onto substrate a hydratable cementitious composition comprising (A) a polycarboxylate polymer cement dispersant, (B) at least one colloidal silica having an average silica particle size of 5 to 150 nanometers, (C) at least one siloxane compound, and (D) a hydratable cementitious binder; wherein the polycarboxylate polymer cement dispersant of component (A) and the at least one colloidal silica of component (B) are first blended together to obtain a uniform colloidal dispersion; then the at least one siloxane component (C) is mixed into the uniform colloidal dispersion to form a liquid suspension; and, thereafter, the liquid suspension is combined with the hydratable cementitious binder of component (D); and wherein, in the liquid suspension containing components (A), (B), and (C) before it is combined with the hydratable cementitious binder of Component (D), the dry-weight of polycarboxylate polymer cement dispersant of component (A) is present in an amount no less than 1.5% and no greater than 50% by weight (dry) based on total weight of the liquid suspension; the dry-weight of colloidal silica solution of component (B) is present in an amount no less than 1% and no greater than 54% by weight (dry) based on total weight of the liquid suspension; and the wet-weight of siloxane compound of component (C) is present in an amount no less than 5% and no greater than 50% by weight (wet) based on total weight of the liquid suspension. The liquid suspension used for modifying the hydratable cementitious binder used in the composition may be based on any of the foregoing exemplary first through fourteenth aspects described above.

In a still further aspect of the invention, the exemplary compositions in accordance with any of the first through fifteenth aspects or the method in accordance with any of the sixteenth through twentieth aspects, as discussed above, may be introduced into a concrete mix during in-transit delivery, using an automated dispensing system, such as available from VERIFI® LLC, a subsidiary of GCP Applied Technologies Inc. of Cambridge, Mass. USA. See e.g., U.S. Pat. Nos. 8,118,473; 8,020,431; 8,746,954; and others. For example, VERIFI® U.S. Pat. No. 8,989,905 teaches the use of a temperature sensor on the truck in combination with two admixture tanks. The present invention would allow for the liquid suspension of components (A), (B), and (C) to occupy only one tank, thereby allowing the delivery truck to use the other tanks for water or other admixtures.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

Example 1

Figure 6:
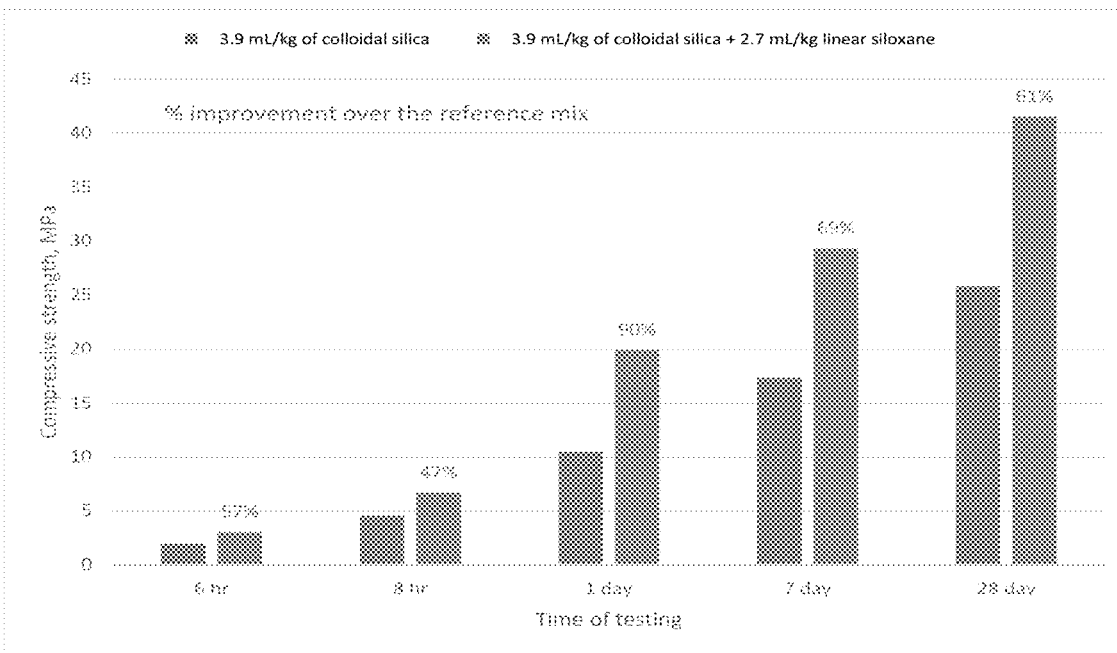
FIG. 6 is a bar chart illustrating percentage improvement in terms of compressive strength of a concrete containing colloidal silica and linear siloxane, as compared to control concrete sample containing only colloidal silica.

As shown in FIG. 6, the present inventors discovered that compressive strength of concrete containing colloidal silica and linear siloxane increases by a greater percentage compared to control concrete sample containing only colloidal silica.

Two concrete mixes were batched with the exact same mix design: one of the mixes contained colloidal silica but no siloxane; the second of the mixes contained both colloidal silica and siloxane wherein each was added individually into the concrete mixture. Beginning from 6 hours onwards, as shown in FIG. 6, siloxane addition contributed to the early age strength development. Thus, at 6 hours, 8 hours, 1 day, 7 days, and 28 days after mixing, the compressive strength gains (MPa) of the concrete mix containing the colloidal silica/linear siloxane combination were shown to provide, respectively, 57%, 47%, 90%, 69%, and 61% greater strength improvement as compared to the reference mix which contained only colloidal silica.

Figure 7:
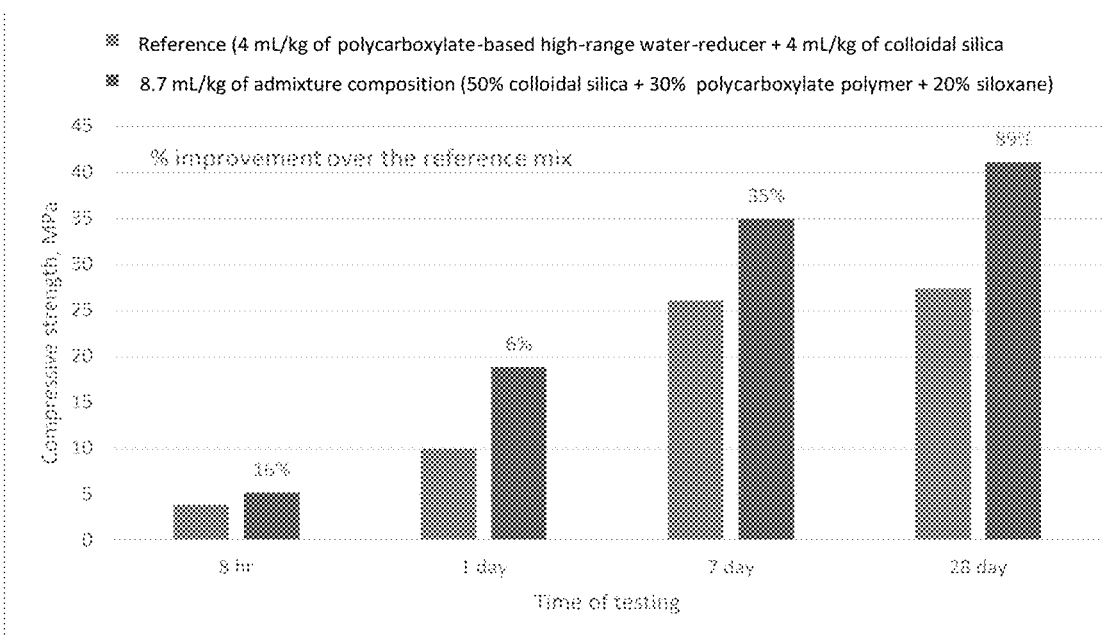
FIG. 7 is a bar chart illustrating percentage improvement in terms of compressive strength of a concrete containing the colloidal silica/polycarboxylate polymer/siloxane of the invention, as compared to control concrete sample which contained only polycarboxylate polymer and colloidal silica but without siloxane.

As shown in FIG. 7, the present inventors discovered that compressive strength of a concrete mix containing the colloidal silica/polycarboxylate polymer/siloxane additive composition of the invention had greater early strength enhancement, as compared to a control concrete sample that contained only polycarboxylate polymer and colloidal silica without siloxane. A concrete mix was batched with an admixture composition in the form of a uniform suspension having the following components: colloidal silica (20% by dry-weight of the total liquid suspension), polycarboxylate polymer (18% by dry-weight of the total liquid suspension), and linear siloxane (20% by wet-weight of the total liquid suspension). The liquid suspension was dosed at 8.7 ml/kg of cementitious material and compared against a reference cementitious mix having the same mix design but incorporating individual additions of 4 ml/kg of polyarboxylate-based high-range water-reducer and 4 ml/kg of colloidal silica, but without the siloxane. As shown in FIG. 7, the inventors discovered that the colloidal silica (20% by dry-weight of the total liquid suspension), polycarboxylate polymer (18% by dry-weight of the total liquid suspension), and linear siloxane (20% by wet-weight of the total liquid suspension) admixture composition obtained an increase in early strength.

Thus, at 8 hours, 1 day, 7 days, and 28 days after mixing, the compressive strength gains (MPa) of the concrete mix containing the colloidal silica/polycarboxylate/siloxane combination were shown to provide, respectively, 16%, 6%, 35%, and 89% greater early age strength improvement as compared to the reference mix which contained only the polycarboxylate polymer and the colloidal silica but without siloxane.

These strength gain results as illustrated in FIG. 7 are consistent with the strength gains illustrated in FIG. 6.

Example 2

Figure 8:
FIG. 8 is photograph of concrete reference samples (on right side of photograph) compared to a concrete mix containing siloxane (on left side of photograph) which demonstrated better finishability.

FIG. 8 illustrates the benefit of using a siloxane in combination with polycarboxlate polymer (otherwise known as High Range Water Reducer, or "HRWR"), as compared to using the polycarboxylate without siloxane.

A comparison was made between a control mix and a mix containing siloxane where both mixes had same HRWR type and dosage rate and also had similar slump of 20±1 cm.

As shown in FIG. 8, when siloxane dosage rate of 4.4 ml/kg based on cementitious binder content was added to the concrete mixture samples in metal cylinders shown on the left of FIG. 8), the finishability of the concrete was significantly improved compared to the control mix samples in metal cylinders shown on the right side of FIG. 8. Areas near cylinder edges were completely clean and displayed smooth surfaces after only a single trowel movement, whereas the control concrete mixture samples that did not contain the siloxane but only the polycarboxylate were difficult to finish, did not have as smooth a surface as the samples on the left, and also displayed rough edges around the cylinder.

Example 3

As shown in FIG. 9, the inventors evaluated the benefit of the present invention on the finishability of surfaces of sticky pavement cementitious mixtures.

A "sticky" concrete pavement mix design was selected (different from the ones tested above) that contained high cementitious materials content (475 kg/m$^3$ of Type III cement with water-to-cementitious materials ratio of 0.35) as this type of mix is known to be difficult to finish (i.e., obtain smooth surface). Two types of siloxane (cyclic and linear) were added, using two different addition methods, in which the siloxane was added inside the concrete mix for one set of mixes and the other set, the siloxane was topically applied by spray application. The reference mix, having no surface (spray) or internal addition (batch) of the admixture treatment, was used as a control for purpose of comparing the relative finish-ability of the mix samples.

The mix samples were prepared as follows, and their surfaces were photographed in FIGS. 9A-9E, as follows:

Mix 1 (FIG. 9A)—Reference mix with no internal or surface treatment

Mix 2 (FIG. 9B)—Mix surface treated with linear siloxane (dose: 2.3 ml/kg)

Mix 3 (FIG. 9C)—Mix surface treated with cyclic siloxane (dose: 2.3 ml/kg)

Mix 4 (FIG. 9D)—Mix batched with linear siloxane (dose: 2.3 ml/kg)

Mix 5 (FIG. 9E)—Mix batched with cyclic siloxane (dose: 2.3 ml/kg)

All mixes had a slump of 25±1 cm, slump flow of 66±3 cm, air content of 1±0.5%, and a mix temperature of 21±0.5° C. Four individuals were asked to finish the mixes and rank the mixes based on their ease of finishability (two individuals finishing cylinders, the remaining two finishing panel molds).

Their rankings are summarized below:

Operator 1 finishing the panel molds (ranking 1-best, 5-worst)
   1—Mix 5 batched with cyclic siloxane
   2—Mix 4 batched with linear siloxane
   3—Mix 3 surface treated with cyclic siloxane
   4—Mix 2 surface treated with linear siloxane
   5—Mix 1 (Reference Control) with no internal or surface treatment Operator 2 finishing the panel molds (ranking 1-best, 5-worst)
   1—Mix 4 batched with linear siloxane
   2—Mix 5 batched with cyclic siloxane
   3—Mix 3 surface treated with cyclic siloxane
   4—Mix 2 surface treated with linear siloxane
   5—Mix 1 (Reference Control) with no internal or surface treatment Operator 3 finishing the cylinders (ranking 1-best, 5-worst)
   1—Mix 4 batched with linear siloxane
   2—Mix 5 batched with cyclic siloxane
   3—Mix 3 surface treated with cyclic siloxane
   4—Mix 2 surface treated with linear siloxane
   5—Mix 1 (Reference Control) with no internal or surface treatment Operator 4 finishing the cylinders (ranking 1-best, 5-worst)
   1—Mix 5 batched with cyclic siloxane
   2—Mix 4 batched with linear siloxane ne
   3—Mix 3 surface treated with cyclic siloxane
   4—Mix 2 surface treated with linear siloxane
   5—Mix 1 (Reference Control) with no internal or surface treatment As it is seen from the rankings, all four operators agreed that the addition of siloxane, both as an admixture inside the concrete or as a topical application improved the finishability of the concrete sample. Although some operators favored one siloxane type (linear or cyclic) over another, all four operators consistently indicated that integral addition of siloxane into the concrete mix was more effective in improving finishability compared to topical (spray) application. The present inventors believe that this result is due to siloxane modification of the rheology of the concrete mix when added as an admixture. The concrete composition appears to be made more slippery and less sticky.

The impact of the effect of siloxane on finishability can also be seen when comparing FIG. 9A, wherein the reference (control) mix had a rough, uneven surface, with FIGS. 9D and 9E, wherein the concrete mix, by virtue of the admixture addition, displayed significantly greater smoothness to the finish of the surface.

Example 4

As shown in FIG. 10, the inventors evaluated the effect on early age strength development of samples of the combination of colloidal silica and siloxane, and found that these provided an increase that appeared synergistic in nature, in that their cumulative effect greater outweighed mere additive effect of their individual contributions to strength.

Sample mixes were made using the exact same mix design, and samples were collected before and after the addition of colloidal silica and siloxane. A reference (control) mix was prepared without colloidal silica or siloxane for comparison. As shown in FIG. 10, 22% strength improvement was observed when 6.6 ml/kg of colloidal silica was added to the mix, as compared to the reference. Similarly, six hour strength was improved by 14% when 2.6 ml/kg of siloxane was added to the mix, as compared to the reference.

When same dosages of siloxane and colloidal silica were added to the mix, the present inventors surprisingly discovered that the impact of this combination on strength improvement was 10% higher than their expected individual contribution (47% obtained vs expected 37% associated with 22% coming from colloidal silica and 14% coming from siloxane). The present inventors believe that incorporating both chemicals in the admixture composition provided a synergistic dispersion effect obtained by both chemicals within the cementitious matrix.

Example 5

As shown in Table 1, the inventors evaluated the percent weight required for each component based on total weight of the liquid suspension both with and without considering their total solid concentration, by dry-weight and wet-weight, respectively.

TABLE 1

| | colloidal silica | | polycarboyxlate-based comb polymer | | linear or cyclic siloxane | |
|---|---|---|---|---|---|---|
| | Min | Max | Min | Max | Min | Max |
| Total solid concentration, % | 10 | 60 | 30 | 100 | 100 | 100 |
| % weight (wet) in the total liquid suspension | 10 | 90 | 5 | 50 | 5 | 50 |
| % weight (dry) in the total liquid suspension | 1 | 54 | 1.5 | 50 | 5* | 50* |
| More preferable: % weight (wet) in the total liquid suspension | 30 | 70 | 15 | 35 | 15 | 35 |
| More preferable: % weight (dry) in the total liquid suspension | 3 | 42 | 4.5 | 24.5 | 15* | 35* |
| Most preferable: % weight (wet) in the total liquid suspension | 40 | 60 | 20 | 30 | 20 | 30 |
| Most preferable: % weight (dry) in the total liquid suspension | 4 | 36 | 6 | 21 | 20* | 30* |

*Siloxane is composed of 100% actives. If the material is being dried, siloxane evaporates. In this table, for siloxane, the dry weight is the wet weight.

The foregoing example and embodiments were present for illustrative purposes only and not intended to limit the scope of the invention.

We claim:

1. An additive composition for hydratable cementitious mixtures, comprising:
    a liquid suspension comprising (A) a polycarboxylate polymer cement dispersant, (B) at least one colloidal silica solution having an average silica particle size of 5 to 150 nanometers and being dispersed within an aqueous or non-aqueous solution, wherein the colloidal silica solution is present in the amount of 1% to 54% by weight (dry) based on the total weight of the liquid suspension, and (C) at least one siloxane compound;
    the polycarboxylate polymer cement dispersant of component (A) being present in an amount no less than 1.5% and no greater than 50% by weight (dry) based on total weight of the liquid suspension;
    the siloxane compound of component (C) being present in an amount no less than 5% and no greater than 50% by weight (wet) based on total weight of the liquid suspension; and
    wherein components (A) and (B) are first blended together to obtain a uniform colloidal dispersion; and, thereafter, component (C) is mixed into the obtained uniform colloidal dispersion to form the liquid suspension.

2. The additive composition of claim 1 wherein, in the siloxane compound, silicon atoms and oxygen atoms are linked within a linear or cyclic backbone structure.

3. The additive composition of claim 2 wherein the siloxane compound has a linear backbone structure represented by Formula I

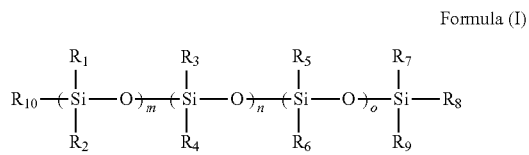

Formula (I)

or a cyclic backbone structure represented by Formula II

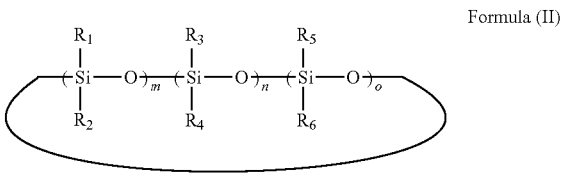

Formula (II)

wherein
    $R_1$, $R_2$, $R_3$, $R_4$, $R_5$, $R_6$, $R_7$, $R_8$, and $R_9$ each independently represent hydrogen, halogen, epoxy, alkyl, amino, amido, alyloxy, alkoxy, ketoximate, acyloxy, acid amido, or aminoxy groups; and
    m, n, and o each independently represent an integer; and, wherein
    in Formula I, the sum of $m+n+o=2$ to 10; m is 1 to 10, n is 0 to 9, and o is 0 to 9, and,
    in Formula II, the sum of $m+n+o=3$ to 10, m is 1 to 10, n is 0 to 7, and o is 0 to 7.

4. The additive composition of claim 3 wherein the siloxane compound is a cyclic dimethylsiloxane.

5. The additive composition of claim 4 wherein the cyclic dimethylsiloxane is chosen from hexamethylcyclotrisiloxane, octamethylcyclo-tetrasiloxane, decamethylcyclopentasiloxane, dodecamethylcyclohexasiloxane, tetradecamethylcycloheptasiloxane, and mixtures thereof.

6. The additive composition of claim 4 wherein the cyclic dimethylsiloxane is chosen from octamethyl-cyclotetrasiloxane, decamethylcyclo-pentasiloxane, dodecamethylcyclohexasiloxane, and tetradecamethylcyclohepta-siloxane, and mixtures thereof.

7. The additive composition of claim 4 wherein the cyclic dimethylsiloxane is chosen from decamethylcyclopentasiloxane, dodecamethyl-cyclohexasiloxane, and mixtures thereof.

8. The additive composition of claim 3 wherein the siloxane compound is a linear dimethylsiloxane.

9. The additive composition of claim 8 wherein the linear dimethylsiloxane is chosen from hexamethyldisiloxane, octamethyltrisiloxane, decamethyltetrasiloxane, dodecamethylpentasiloxane, and tetradeca methylhexa-siloxane, and mixtures thereof.

10. The additive composition of claim 8 wherein the linear dimethylsiloxane is chosen from octamethyltrisiloxane, decamethyltetrasiloxane, dodecamethylpentasiloxane, tetradecamethylhexasiloxane, and mixtures thereof.

11. The additive composition of claim 8 wherein the linear dimethylsiloxane is chosen from decamethyltetrasiloxane, dodecamethylpenta-siloxane, and mixture thereof.

12. The additive composition of claim 1 wherein the components (A), (B), and (C) are present in the liquid suspension in the following ratios: (A) 1.5% to 50% by dry weight of the total weight of liquid suspension; (B) 1% to 54% by dry weight of the total weight of liquid suspension; and (C) 5% to 50% by wet weight of the total weight of liquid suspension.

13. The additive composition of claim 1 further comprising a component chosen from biocides, amines, silane, fumed silica, precipitated silica, nanosilica, hydrated alumina, magnesium silicate, calcium silicate, magnesium hydroxide, lime, gypsum, pH stabilizers, 2-Acrylamido-2-methylpropane sulfonic acid (AMPS), glycol, glycerin, clay-based materials, melamine sulfonate, lignin sulfonate, sodium gluconate, naphthalene sulfonate, lithium silicate, methylcellulose, xanthan gum, guar gum, welan gum, diutan gum, strength enhancers, and pigments.

14. The additive composition of claim 1 further comprising a conventional concrete admixture chosen from set accelerators, set retarders, shrinkage reducing agents, crack control agents, strength enhancing agents, expansive agents, air-entraining admixtures, air detrainers, water-reducers, viscosity/rheology modifying agents, corrosion inhibitors, integral waterproofing admixtures, water repellents, curing compounds, permeability reducing admixtures, alkali-silica reaction mitigating admixtures, efflorescence reducing admixtures, and mixtures thereof.

15. The additive composition of claim 1 wherein the liquid suspension comprising components (A), (B), and (C) has a viscosity of at least 500 centipoise and a viscosity no greater than 6000 centipoise (as measured by Brookfield Viscometer LV, spindle 64, 60 rpm, 21° C. sample, at ambient temperature).

16. The additive composition of claim 1 wherein the components (A), (B), and (C) are present in the liquid suspension in the following ratios: (A) 4.5% to 24.5% by dry weight of the total weight of liquid suspension; (B) 3% to 42% by dry weight of the total weight of liquid suspension; and (C) 10% to 35% by wet weight of the total weight of liquid suspension.

17. The additive composition of claim 1 wherein the components (A), (B), and (C) are present in the liquid suspension in the following ratios: (A) 6% to 21% by dry weight of the total weight of liquid suspension; (B) 4% to 36% by dry weight of the total weight of liquid suspension; and (C) 15% to 30% by wet weight of the total weight of liquid suspension.

18. The additive composition of claim 1 further comprising a clay-based material chosen from Sepiolite and Attapulgite.

19. A composition comprising a cementitious binder and the additive composition of claim 1.

20. A method for modifying a hydratable cementitious composition comprising: mixing into a hydratable cementitious composition the additive composition of claim 1.

21. A method for making an additive composition, comprising: mixing together a polycarboxylate polymer cement dispersant and colloidal silica to obtain a blended colloidal dispersion; and, thereafter, mixing into the blended colloidal dispersion at least one siloxane compound to obtain a liquid suspension, the polycarboxylate polymer being present in an amount no less than 1.5% and no greater than 50% by weight (dry) based on total weight of the liquid suspension; the colloidal silica being present in an amount no less than 1% and no greater than 54% by weight (dry) based on total weight of the liquid suspension, the silica particles having an average particle size of 5 to 150 nanometers; and the at least one siloxane compound being present in an amount no less than 5% and no greater than 50% by weight (wet) based on total weight of the liquid suspension.

22. The method of claim 21 wherein the mixing of the polycarboxylate polymer cement dispersant and colloidal silica to obtain the blended colloidal dispersion, and the subsequent mixing into the blended colloidal dispersion at least one siloxane compound to obtain a liquid suspension, are accomplished under the following conditions:
 (A) Mixing the components at a mixing speed of 1 to 1500 rpm;
 (B) Mixing the components for a period of 5 to 360 minutes; and
 (C) Mixing the components at a temperature of −10° C. to +50° C.

23. The method of claim 21 wherein the components are mixed at a speed of 300 and 600 rpm, for a period of 5 to 60 minutes, at a temperature of +10° C. to +30° C.

24. The method of claim 21 wherein the siloxane compound has a linear backbone structure represented by Formula I

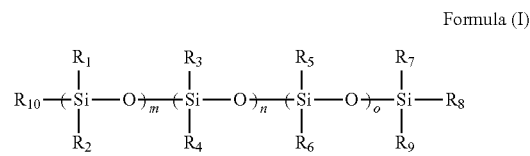

Formula (I)

or a cyclic backbone structure represented by Formula II

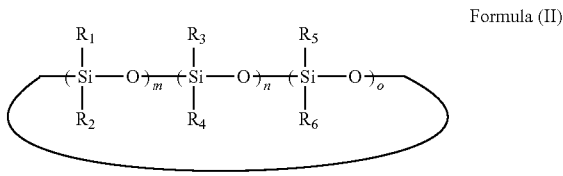

Formula (II)

wherein
 $R_1$, $R_2$, $R_3$, $R_4$, $R_5$, $R_6$, $R_7$, $R_8$, and $R_9$ each independently represent hydrogen, halogen, epoxy, alkyl, amino, amido, alyloxy, alkoxy, ketoximate, acyloxy, acid amido, or aminoxy groups; and
 m, n, and o each independently represent an integer; and, wherein
 in Formula I, the sum of m+n+o=2 to 10; m is 1 to 10, n is 0 to 9, and o is 0 to 9, and,
 in Formula II, the sum of m+n+o=3 to 10, m is 1 to 10, n is 0 to 7, and o is 0 to 7.

25. A method for applying shotcrete, comprising:
spray-applying onto substrate a hydratable cementitious composition comprising (A) a polycarboxylate polymer cement dispersant, (B) at least one colloidal silica having an average silica particle size of 5 to 150 nanometers, (C) at least one siloxane compound, and (D) a hydratable cementitious binder;
wherein the polycarboxylate polymer cement dispersant of component (A) and the at least one colloidal silica of component (B) are first blended together to obtain a uniform colloidal dispersion; then the siloxane compound of component (C) is mixed into the uniform colloidal dispersion to form a liquid suspension; and, thereafter, the liquid suspension is combined with the hydratable cementitious binder of component (D); and wherein, in the liquid suspension containing components (A), (B), and (C) before it is combined with the hydratable cementitious binder of Component (D),
  (i) the polycarboxylate polymer cement dispersant of component (A) is present in an amount no less than 1.5% and no greater than 50% by weight (dry) based on total weight of the liquid suspension;
  (ii) the colloidal silica solution of component (B) is present in an amount no less than 1% and no greater than 54% by weight (dry) based on total weight of the liquid suspension; and
  (iii) the siloxane compound of component (C) is present in an amount no less than 5% and no greater than 50% by weight (wet) based on total weight of the liquid suspension.

* * * * *